United States Patent [19]

Kaczeus et al.

[11] Patent Number: 4,568,992
[45] Date of Patent: Feb. 4, 1986

[54] DISC DRIVE LINEAR ACTUATOR

[75] Inventors: Steven Kaczeus, Santa Cruz; Stephen Bibby, Los Gatos, both of Calif.

[73] Assignee: Seagate Technology, Scotts Valley, Calif.

[21] Appl. No.: 603,549

[22] Filed: Apr. 25, 1984

[51] Int. Cl.⁴ ............................................. G11B 5/54
[52] U.S. Cl. ..................................... 360/105; 360/109
[58] Field of Search ............................. 360/105–106, 360/109, 137, 97–99

[56] References Cited

U.S. PATENT DOCUMENTS 4,414,594 11/1983 Farmer et al. ................... 360/106
4,415,941 11/1983 Gibeau et al. ................... 360/106

FOREIGN PATENT DOCUMENTS 2013413A 8/1979 United Kingdom ........... 360/106 X
2080599 2/1982 United Kingdom ........... 360/106 X Primary Examiner—John H. Wolff
Attorney, Agent, or Firm—Flehr, Hohbach, Test, Albritton & Hepbert

[57] ABSTRACT

A head positioning apparatus for positioning magnetic heads relative to a recording medium is disclosed herein. This apparatus includes a carriage adapted to mount magnetic heads and a carriage guide for linearly guiding the carriage to position the heads relative to a recording medium. A linear drive mechanism is provided for imparting linear movement to the carriage. The carriage is supported for movement relative to the guide and comprises a plurality of bearings captured in grooves in the guide and the carriage, at least one of the bearings is on each side of the carriage, and a retainer movable parallel and proportionately to the carriage to hold the bearings in position relative to the carriage.

12 Claims, 3 Drawing Figures

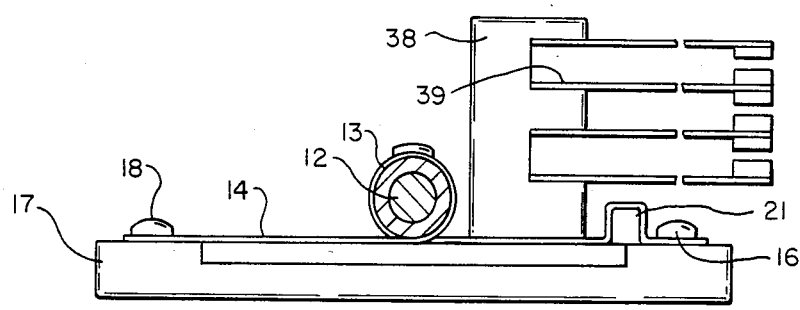
FIG. — 1
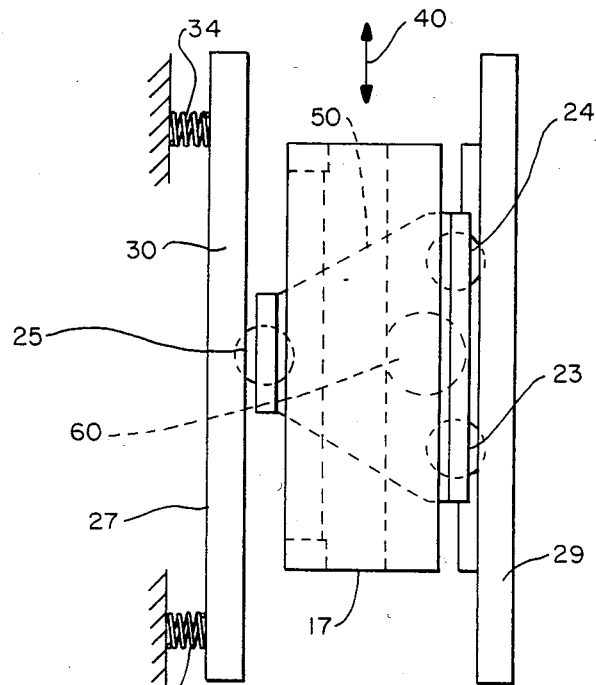
FIG. — 2
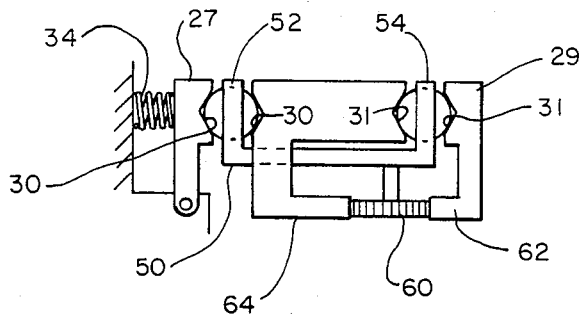
FIG. — 3

DISC DRIVE LINEAR ACTUATOR

The present relates generally to a head positioning assembly for disc drive apparatus and more particularly to an improved linear actuator.

Disc drive machines record and reproduce information stored in concentric circular tracks recorded on magnetic discs. Tracks are written and read by magnetic heads which cooperate with the surface of the disc. Various methods have been used to position the head including lead screws and band drives. Band drives are shown and described in U.S. Pat. Nos. 3,881,139 and 4,161,004 and 4,170,146 among others. These drives convert rotary motion of a stepper motor to linear motion of the carriage which moves the heads mounted on the carriage radially across the disc to record and read adjacent concentric circular tracks. The drive band is wrapped around the motor shaft or a pulley attached to the shaft and has its ends attached to the carriage whereby rotation of the shaft wraps one end of the band on the pulley while upwrapping the other causing the carriage to move linearly.

Guide means are associated with the carriage to guide the carriage in its linear travel to assure that the heads move radially across the associated disc. A new track is recorded at each step of the stepper motor. The spacing of the tracks is dependant upon the amount of rotation that the motor shaft undergoes with each step and the diameter of the pulley on which the band is wound. This configuration, called a linear carriage or linear actuator, is typically supported by six precisely aligned ball bearings, riding on two ground and hardened metallic rods. This makes the magnetic head transfer mechanism rather complex and expensive as compared to the rotary actuator, where two supporting bearings are sufficient. Although the linear carriage design has its disadvantages, many times design requirements or stiffness advantages mandate the use of this accessing device.

It is a primary object of the present invention to provide an improved linear actuator for use in a disc drive assembly.

An objective of the present invention to develop a simple low cost linear actuator utilizing a reduced number of ball bearings.

In the magnetic recording field, there is a demand for greater data recording density which makes it desirable to minimize the spacing between tracks and yet be able to recover the stored information by being able to precisely locate a particular track for retrieval or writing.

It is an objective of the present invention to provide a linear actuator capable of low inertia, low friction movement over short distances to facilitate accessing of closely adjacent tracks.

A further objective of the present invention is to design a disc drive which is easier to manufacture because all its parts are easy to align and which does not contain lubricants which are a source of contamination for discs. It is therefore an objective of the present invention to provide a linear actuator which does not include any lubricants, a source of contamination in many known disc drives due to outgassing which occurs during use of the drive.

The above and other objects of the invention are achieved by a positioning apparatus including a carriage, guides for directing the linear travel of the carriage, and drive means driven by a stepper motor for moving the carriage from one position to another. The carriage is supported in guide means for rolling movement by three hardened and ground balls confined in grooves cut in the sides of the carriage and the guide rails. The balls are separated and confined in the longitudinal direction by a retainer which moves parallel and proportionately to the carriage. The retainer is moved by a rack and pinion device, the pinion being movable with the retainer and confined between two racks, one rack being fixed to one of the guide walls or rails, the other rack being movable with the carriage itself.

The foregoing and other objects of the present invention will be more clearly understood from the following description and appended claims taken in connection with the drawings in which:

FIG. 1 is a side elevational view of a drive carriage as is well known in the disc drive industry;

FIG. 2 is a top view of the carriage (without head carrying mechanism or drive mechanism) showing the relationship of the carriage, the side wall, the bearings and retainer of the invention;

FIG. 3 is an end elevational view of the carriage, retainer and guide mechanism of the present invention.

In U.S. Pat. No. 4,323,939 issued Apr. 6, 1982 entitled HARD FIXED DRIVE ASSEMBLY AND READ/WRITE HEAD ACTUATOR assigned to the assignee of this invention, there is described a disc drive apparatus in which the present invention is useful; and the disclosures of this patent are incorporated herein by reference.

Referring to FIG. 1, a head carriage useful with a typical linear actuator comprises a stepper motor (not shown) having a drive shaft 12, and a pulley 13 carried at one end of the drive shaft 12 and adapted to receive a drive band 14. This band, as is well known in the disc drive technology, includes an inner portion secured by a screw 16 to one end of the carriage 17 and a pair of outer portions secured by a screw 18 to the other end of the carriage. Preferably the drive band includes a U shaped spring portion 21 to maintain predetermined tension on the band. The center portion of the band, where the inner and outer portions merge, is suitably secured to the pulley 13. Rotation of the pulley clockwise or counter clockwise winds and unwinds band portions to move carriage 17 to position the heads. The carriage includes (as shown in FIG. 2) spaced bearings 23, 24, 25 disposed in a generally triangular configuration. These rolling elements preferably comprise hardened and ground balls. The balls are confined between rails 27 and 29 and the moving carriage 17.

Both the rails 27, 29 and the sides of the carriage 17 have V shaped grooves 30, 31 for positioning the balls between the support rails and the carriage. Thus the balls roll smoothly as the carriage rolls back and forth between the rails 27 and 29.

In order to minimize clearance between the rolling balls 23-25 and the V shaped grooves 30, 31, one of the rails 27 is spring mounted 34, preferably from a side wall of the disc drive. The other rail 29 is fixed or may even comprise a portion of the side wall of the disc drive. As a result of the spring mounted rail, the balls are laterally confined and maintained in close contact with the defined trackway. This provides lateral self alignment with minimum wear on the bearings. This arrangement is important because the carriage 17 as shown in FIG. 1 is relatively light, and mounts an E shaped or other suitable mount 38 for a plurality of magnetic heads 39 which are adapted to be aligned selectively with one or more tracks on the associated recording discs. Thus by controlling the stepper motor, the carriage 17 moves linearly along a path 40 (FIG. 2) to move the heads radially in and out across the associated disc to read and write information on the disc surface.

It is obviously important to confine the ball bearings 23–25 in the longitudinal as well as the lateral direction. This longitudinal confinement is provided by a generally triangular retainer 50 (FIGS. 2 and 3) to move parallel with and proportional (2:1) to movement of the rolling carriage 17. The triangular retainer 50 (FIGS. 2 and 3) has holes in its upright walls 52, 54 (FIG. 3) in which each of the ball bearings can rotate. This provides for appropriate longitudinal confinement of the ball bearings while providing a system which needs no lubrication to allow for free rolling contact of the balls as the carriage slides in and out along the pathway 40 (FIG. 2).

As shown in FIG. 3, the retainer 50 is itself located along the pathway 40 (FIG. 2) by a rack and pinion mechanism which assures a constant relative position of balls 23–25 relative to the carriage 17 at any time during use of the mechanism. This retainer and rack and pinion combination assure proper location of the ball bearings even under shock or vibration conditions. The gear of pinion 60 is generally centered along pathway 40 (FIG. 2) between two of the ball bearings 23, 24 on one side of the carriage. One of the toothed racks 62 on which the pinion rotates is fixedly mounted, preferably on the fixed rail 29. The other rack 64 comprises a piece which is mounted directly to the rolling carriage 17. One of the racks is intended to be secured to or an integral part of the carriage. This dual rack and pinion mechanism assures that the retainer displacement is half of the movement of the carriage at all times, and helps assure proper positioning of the carriage while retaining the position of the ball bearings relative to the carriage.

Both the carriage 17 and the supporting rails 27, 29 can be of materials such as aluminum extrusions. The ball contact areas comprising the grooves 30,31 can, for example, be hard anodized or hard chrome plated for wear resistance and shock durability. The racks 62, 64 and pinion 60 are precision injected molded components. Other materials may be apparent to a person of skill in the art; this invention is not limited to use of these materials.

The advantage of this ball and V groove channel arrangement is that those elements define a plane parallel with the desired plane of movement of the read/write heads. Consequently, no alignment or high precision construction is required, and the mechanism is relatively free of binds, jams, and sliding friction to allow for more accurate placement of the heads relative to the discs. The embodiment disclosed herein utilizes three balls in a triangular array; three balls define a plane and facilitate manufacture of the invention. The addition of even one additional ball would allow the possibility of misalignment from the desired plane and eliminate one clear advantage of the three ball arrangement. The application of more balls in either channel with an expanded size retainer is possible.

The invention herein of this linear actuator has been described with reference to a specific embodiment. However, the description is illustrative of the invention and is not to be construed as limiting the invention. Various modifications and applications may be apparent to those of skill in the art without departing from the true spirit and scope of the invention as defined by the following claims.

What is claimed is:

1. Head positioning apparatus for positioning magnetic heads relative to a recording medium including a carriage adapted to mount said magnetic heads; carriage guide means for linearly guiding said carriage to position said heads relative to said recording medium; linear drive means for imparting linear movement to said carriage, means for supporting said carriage for movement relative to said guide means comprising a plurality of bearings captured in grooves in said guide means and said carriage, at least one said bearing on each side of said carriage, and a retainer movable parallel and proportionately to said carriage to hold said bearings in position relative to said carriage.

2. Head positioning apparatus as claimed in claim 1 wherein said retainer moving means comprise a pinion movable with said retainer along a rack fixed stationary relative to said guide means, and a second rack fixed stationary relative to said carriage.

3. Head positioning apparatus as claimed in claim 2 wherein the pinion is located substantially equidistant from two balls located on one side of the carriage.

4. Head positioning apparatus as claimed in claim 2 wherein said carriage guide means comprise first and second rails mounted on opposite sides of said carriage, one of said rails being fixed, the other of said rails being biased laterally toward said carriage.

5. Head positioning apparatus as claimed in claim 1 wherein said retainer moving means comprise a pinion fixed to said retainer and captured between a first rail fixed relative to said guide means and a second rail movable with said carriage.

6. A linear actuator for the linear positioning of magnetic heads in disc drive apparatus for storing data in the form of magnetic recording on disc-shaped recording surfaces, said actuator comprising a carriage movable relative to the walls of said disc drive within a carriage guide, said carriage being supported for movement relative to said guide by three bearings held in grooves in the sides of said carriage and carriage guide means, a retainer movable parallel and proportionately to said carriage for fixing the position of said bearings relative to said carriage and means for controlling the rate and distance of movement of said retainer.

7. An actuator as claimed in claim 6 wherein said control means comprise a pinion rotatable between a first rack carried by said carriage and a second rack fixed to said carriage guide.

8. A linear actuator for the linear positioning of magnetic heads in disc drive apparatus for storing data in the form of magnetic recording on disc-shaped recording surfaces, said actuator comprising a carriage movable relative to the walls of said disc drive within a carriage guide, said carriage being supported for movement relative to said guide by at least three bearings held in grooves in the sides of said carriage and carriage guide means, a retainer movable parallel and proportionately to said carriage for fixing the position of said bearings relative to said carriage and means for controlling the rate and distance of movement of said retainer proportionately to movement of said carriage.

9. An actuator as claimed in claim 8 wherein said bearings are disposed in a triangular array, said pinion being approximately centered between two of the bearings on the same side of said carriage.

10. An actuator as claimed in claim 9 comprising a U-shaped retainer including upstanding walls interposed between the edges of the carriage and the walls for holding the bearings in position relative to the carriage, the base of the retainer supporting said pinion between said racks.

11. An actuator as claimed in claim 10 wherein the first rack is carried beneath the carriage and extends along a path traveled by the carriage parallel to the walls.

12. An actuator as claimed in claim 11 wherein the pinion is carried beneath the retainer to be captured between the racks.

* * * * *